United States Patent
Engelhard et al.

(10) Patent No.: US 7,033,502 B2
(45) Date of Patent: *Apr. 25, 2006

(54) UV LAMP SUPPORTED FILTER CARTRIDGE

(75) Inventors: Rolf Engelhard, Prescott, AZ (US); Stephen P. Kasten, Prescott, AZ (US)

(73) Assignee: RCT Technologies LLC, Prescott, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/942,655

(22) Filed: Sep. 16, 2004

(65) Prior Publication Data

US 2005/0035053 A1    Feb. 17, 2005

Related U.S. Application Data

(63) Continuation of application No. 10/361,235, filed on Feb. 10, 2003, now Pat. No. 6,830,686, which is a continuation of application No. 09/706,964, filed on Nov. 6, 2000, now abandoned.

(60) Provisional application No. 60/175,797, filed on Jan. 12, 2000.

(51) Int. Cl.
    *B01D 29/33* (2006.01)

(52) U.S. Cl. .............................. 210/497.01; 210/323.2

(58) Field of Classification Search ................ 210/192, 210/322, 323.1, 323.2, 346, 450, 483, 493.2, 210/497.01; 55/502, 510; 250/436
    See application file for complete search history.

(56) References Cited

U.S. PATENT DOCUMENTS

| | | | |
|---|---|---|---|
| 3,696,932 A * | 10/1972 | Rosenberg | 210/437 |
| 3,726,404 A * | 4/1973 | Troglione | 210/139 |
| 4,536,291 A * | 8/1985 | Hoffmann et al. | 210/457 |
| 4,857,204 A * | 8/1989 | Joklik | 210/695 |
| 5,106,495 A * | 4/1992 | Hughes | 210/139 |
| 5,106,501 A * | 4/1992 | Yang et al. | 210/266 |
| 5,266,215 A * | 11/1993 | Engelhard | 210/748 |
| 5,476,585 A * | 12/1995 | Mills | 210/232 |
| 5,540,848 A * | 7/1996 | Engelhard | 210/748 |
| 5,935,431 A * | 8/1999 | Korin | 210/205 |
| 6,099,729 A * | 8/2000 | Cella et al. | 210/315 |
| 6,830,686 B1 * | 12/2004 | Engelhard et al. | 210/323.2 |

FOREIGN PATENT DOCUMENTS

| | | | |
|---|---|---|---|
| DE | 3828026 | * | 2/1990 |
| EP | 316687 | * | 4/1988 |
| EP | 375373 | * | 6/1990 |

* cited by examiner

*Primary Examiner*—Matthew O. Savage
(74) *Attorney, Agent, or Firm*—Cahill, Von Hellens & Glazer P.L.C.

(57) ABSTRACT

Each cap of a pair of end caps mounted on opposed ends of a conventional radial flow cylindrical filter element of a filter cartridge includes a circular sleeve extending axially from the filter element for penetrably receiving a supporting stud and for maintaining an O-ring seal therebetween. The area of one of the end caps radially outwardly of its circular sleeve is greater than the corresponding area of the other end cap to cause fluid to be filtered to pressure bias the filter cartridge toward the other end cap and to positionally retain the filter cartridge within its housing. A positioning member extending into the filter element from one of the end caps receives and stabilizes sleeve for a u/v lamp disposed within the filter element to kill any microorganisms present and to oxidize any organic matter subjected to the emitted ultra-violent radiation.

10 Claims, 6 Drawing Sheets

UV LAMP SUPPORTED FILTER CARTRIDGE

CROSS-REFERENCE TO RELATED APPLICATIONS

This application is a continuation application of and claims priority to an application entitled "FILTER CARTRIDGE SUPPORT", filed Feb. 10, 2003, assigned Ser. No. 10/361,235, which application matured into U.S. Pat. No. 6,830,686, issued on Dec. 14, 2004 and which application is a continuation of an application entitled "FILTER CARTRIDGE SUPPORT", filed Nov. 6, 2000, assigned Ser. No. 09/706,964, now abandoned, which application includes material disclosed in and claims priority to a provisional patent application entitled "EK FILTER", filed Jan. 12, 2000, assigned Ser. No. 60/175,797, all of which applications are directed to an invention made by the present inventors and assigned to the present assignee.

BACKGROUND OF THE INVENTION

1. Field of the Invention

The present invention relates to mountings for filter cartridges and, more particularly, to seals for sealing opposed ends of a filter element of a filter cartridge that accommodate for axial movement of the filter cartridge without compromising the seals.

2. Description of Related Art

Filter cartridges have been in use for decades to filter with a cylindrical filter element a fluid flowing radially therethrough. Usually the fluid flow through the filter element is from its external surface to its internal surface. Thereafter, the fluid is exhausted axially from one end. Each opposed end of the filter element include a compressible annular cap mating with an annular knife edge of a housing. Each annular knife edge forms a seal with the respective end cap as a function of the compression therebetween imposed by the housing and the elasticity and resiliency of the filter element. Over a period of time, the end caps tend to acquire a set and the pressure against the corresponding annular knife edge diminishes to the point where the seal is compromised.

The resiliency and elasticity of the filter element providing a bias against the opposed annular knife edges diminish over a period of time or through deterioration caused at least in part by interaction with the fluid being filtered. The loss of resiliency and elasticity compromises the bias force against the opposed annular knife edges. The pressure differential on opposed sides of each annular knife edge increases as the filter element becomes more and more clogged. Such increase in pressure differential, coupled with the compromised sealing bias, will cause leakage. The resulting leakage will contaminate the previously filtered fluid with potentially disastrous results.

The previously known solution to extend the filtering life of a filter cartridge has been that of increasing the pressure bias of the annular knife edges on the opposed ends of the filter element. At best, this solution increases the life of the sealing function of the annular knife edges for a limited period of time.

Another problem with conventional filter cartridges is that tolerances of filter cartridges from different manufacturers are not the same. Thus a presumably standard sized filter cartridge may not fit a housing for such filter cartridge sufficiently well to maintain a seal for a reasonable period of time before being affected by the above described modes of deterioration.

SUMMARY OF THE INVENTION

A housing for a filter cartridge includes a cylinder having a closed bottom for receiving the filter cartridge and a top threadedly engageable with the open end of the cylinder to close the housing. An inlet proximate to the bottom of the cylinder introduces fluid to be filtered to the exterior surface of the filter cartridge and an outlet in axial alignment with the filter cartridge extends through the top for discharge of the filtered fluid. An end cap on the filter cartridge includes a circular sleeve for receiving a stud extending inwardly from the bottom of the cylinder and an O-ring disposed therebetween serves as a seal to prevent inflow of unfiltered fluid into the axial center of the filter cartridge. A similar end cap is disposed at the other end of the filter cartridge; its circular sleeve circumscribes a hollow stud defining the outlet and an O-ring disposed between the stud and the circular sleeve prevents mixing of the filtered and unfiltered fluids. The use of the O-rings between the respective circular sleeves and studs accommodates axial translation of the filter cartridge without compromising the respective seals. By having the surface area radially external of the circular sleeve of one of the end caps greater than that of the other end cap provides a pressure bias induced by the inflowing unfiltered fluid to urge the filter cartridge in the direction of the end cap with the lesser area subject to the inflowing unfiltered fluid. Upon axially stacking two or more filter cartridges, an O-ring is placed intermediate overlapping circular sleeves of adjacent cartridges to maintain the seal at the junction of the filter cartridges to preclude mixing of the filtered and unfiltered fluids.

It is therefore a primary object of the present invention to provide seals at opposed ends of a filter cartridge that do not depend upon resiliency and elasticity of the filter element.

Another object of the present invention is to provide seals for a filter cartridge that accommodate axially translation of the filter cartridge without compromising the respective seals.

Yet another object of the present invention is to provide sealing elements at opposed ends of a filter cartridge to permit use of a single or axially stacked filter cartridges within a housing without compromising the seals necessary to prevent mixing of filtered and unfiltered fluids flowing through the housing.

A further object of the present invention is to provide a housing for a filter cartridge which does not compress the filter cartridge to establish seals to control flow of the fluid to be filtered therein.

A yet further object of the present invention is to provide an end cap for a filter cartridge which positionally maintains an ultra-violet lamp assembly in fixed position therewithin.

A still further object of the present invention is to provide an axially translatable filter cartridge disposed in sealed relationship within a housing for supporting an ultra-violet lamp assembly therewithin.

A still further object of the present invention is to bias a filter cartridge toward one end of an enclosing housing as a function of the pressure of the inflowing fluid to be filtered.

A still further object of the present invention is to provide an inexpensive filter cartridge and housing having seals not affected by deterioration of the resiliency and elasticity of the filter element.

A still further object of the present invention is to provide a method for sealing a filter cartridge within a housing.

The and other objects of the present invention will become apparent to those skilled in the art as the description thereof proceeds.

BRIEF DESCRIPTION OF THE DRAWINGS

The present invention will be described with greater specificity and clarity with reference to the following drawings, in which.

DESCRIPTION OF THE PREFERRED EMBODIMENT

Figure 1:
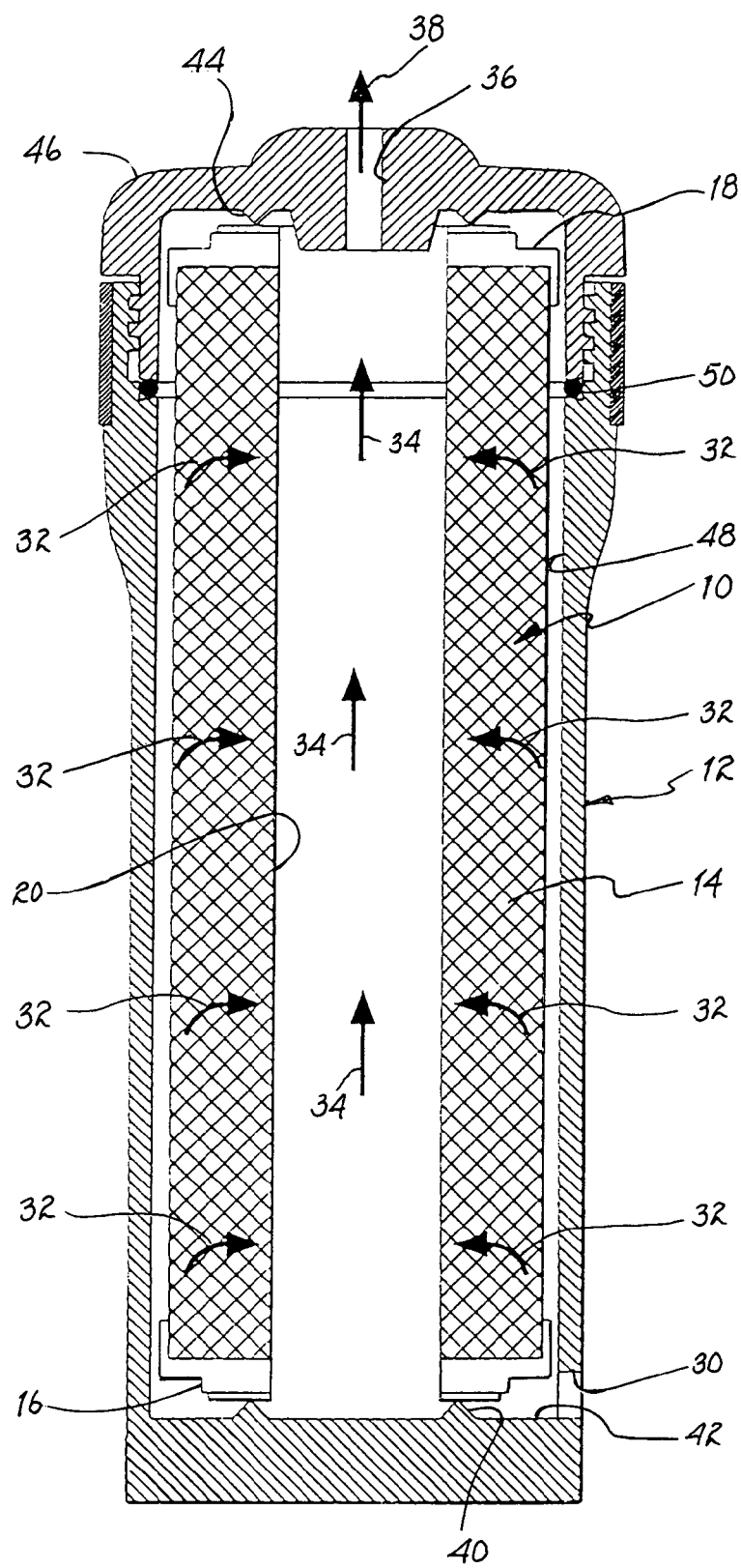
FIG. 1 illustrates a cross section of a conventional filter cartridge, housing and attendant seals used in the prior art.

FIG. 1 illustrates a conventional prior art filter cartridge 10 mounted within a representative housing 12. The filter cartridge includes a cylindrical filter element 14 having annular end caps 16, 18. Usually, these end caps are identical and each of the end caps is formed of a rubber-like resilient material. Housing 12 includes an inlet 30 for introducing a fluid to be filtered about the external surface of the filter cartridge. As represented by arrows 32, the fluid to be filtered flows through filter element 14 into an axial cavity 20 within the filter cartridge. The filtered fluid flows through the axial cavity 20, as represented by arrows 34, and through outlet 36, as represented by arrow 38. An annular knife edge 40 is formed on bottom 42 of housing 12 to compressively engage a corresponding surface of end cap 16. Upon such engagement, a seal is formed therebetween to prevent flow of unfiltered fluid from inlet 30 therebetween into axial cavity 20. A similar annular knife edge 44 extends downwardly from top 46 of housing 12 to compressively engage end cap 18. Upon such engagement, a seal is established to prevent flow past the end cap of unfiltered fluid into axial cavity 20. An annular space 48 is disposed about filter cartridge 10 and the corresponding wall of housing 12 to distribute the inflowing unfiltered fluid along the length of the external surface of the filter cartridge. Top 46 may be threadedly engaged with the rest of housing 12, as illustrated. An O-ring 50, or the like, may be used to effect a seal between the top and the housing.

The integrity of the seal at each of end caps 16 and 18 is a function of the degree to which annular knife edges 40 and 44 compress the corresponding end cap. Initially, such seal is usually very effective. This seal depends upon several variables: the resiliency of the end caps to maintain compressive engagement with the corresponding annular knife edge, the resiliency of filter element 14 to bias the end caps against their respective annular knife edges, and, the properties of the fluid being filtered to induce deterioration of the resilience of the filter cartridge components.

Figure 2:
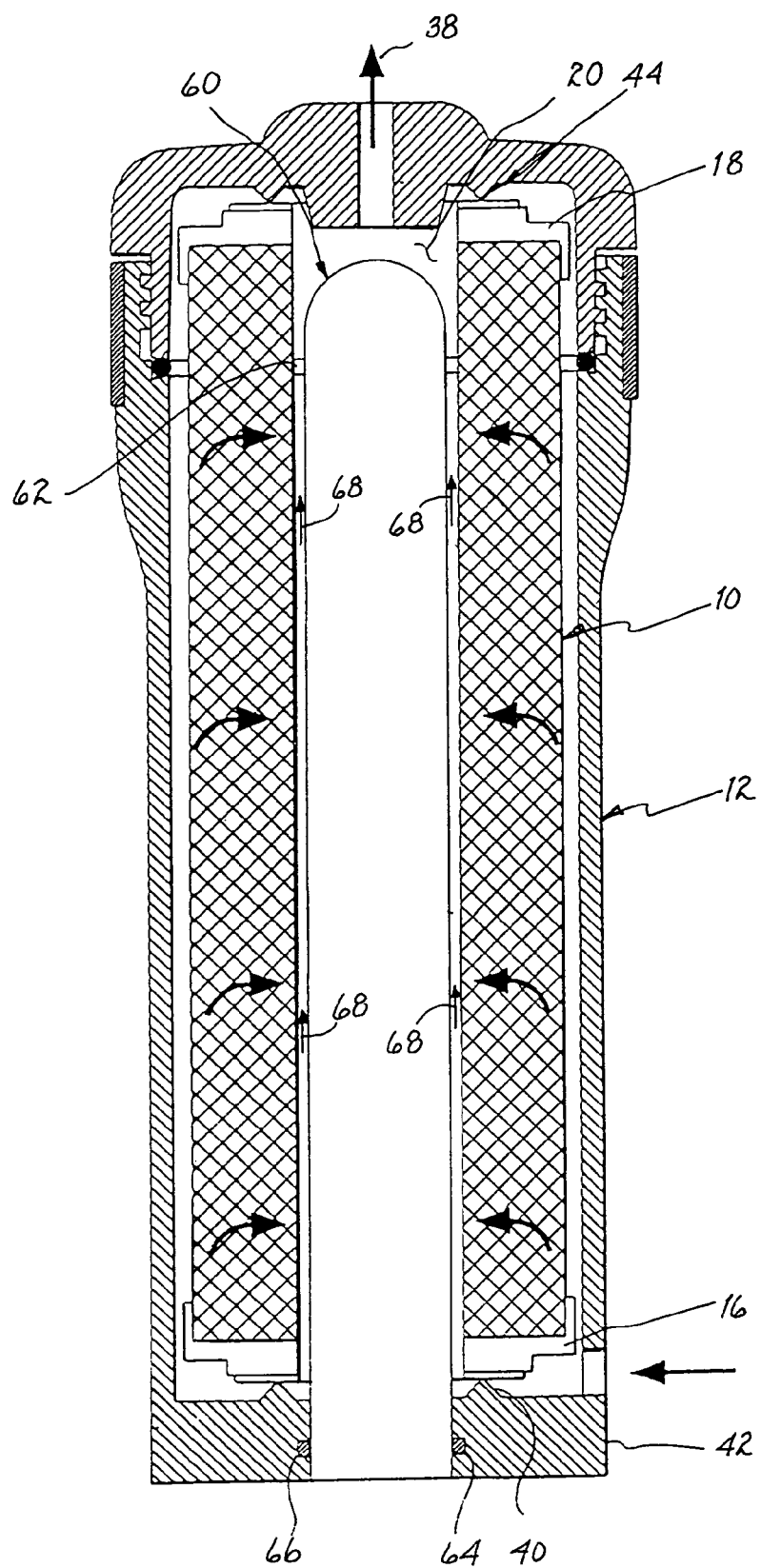
FIG. 2 illustrates a cross section of a conventional prior art filter cartridge and housing for supporting a UV lamp assembly within the filter cartridge.

FIG. 2 illustrates a filter cartridge 10 and housing 12 similar to that shown in FIG. 1 and representative of prior art embodiments. That is, it in includes annular knife edges 40, 44 sealingly cooperating with annular end caps 16, 18. In some applications, an ultra-violet lamp is disposed within the filter cartridge to irradiate with ultra-violet radiation filtered fluid flowing into axial cavity 20. To protect the ultra-violet lamp, a sleeve 60 is disposed within axial cavity 20 in general radial alignment with filter cartridge 10. This sleeve houses the ultra-violet lamp and may be made of quartz or similar material transparent to ultra-violet radiation. An annular spacer 62, or the like, may be employed to maintain the displacement between sleeve and the filter cartridge. Necessarily, the sleeve is sealed by O-ring 64 or the like mounted in annular groove 66 in bottom 42 of housing 12. Usually, no support is provided between sleeve 60 and the interior surface of the filter cartridge. The outflow of the filtered fluid, as represented by arrows 68, occurs intermediate sleeve 60 and the adjacent surface of the filter cartridge.

Figure 3:
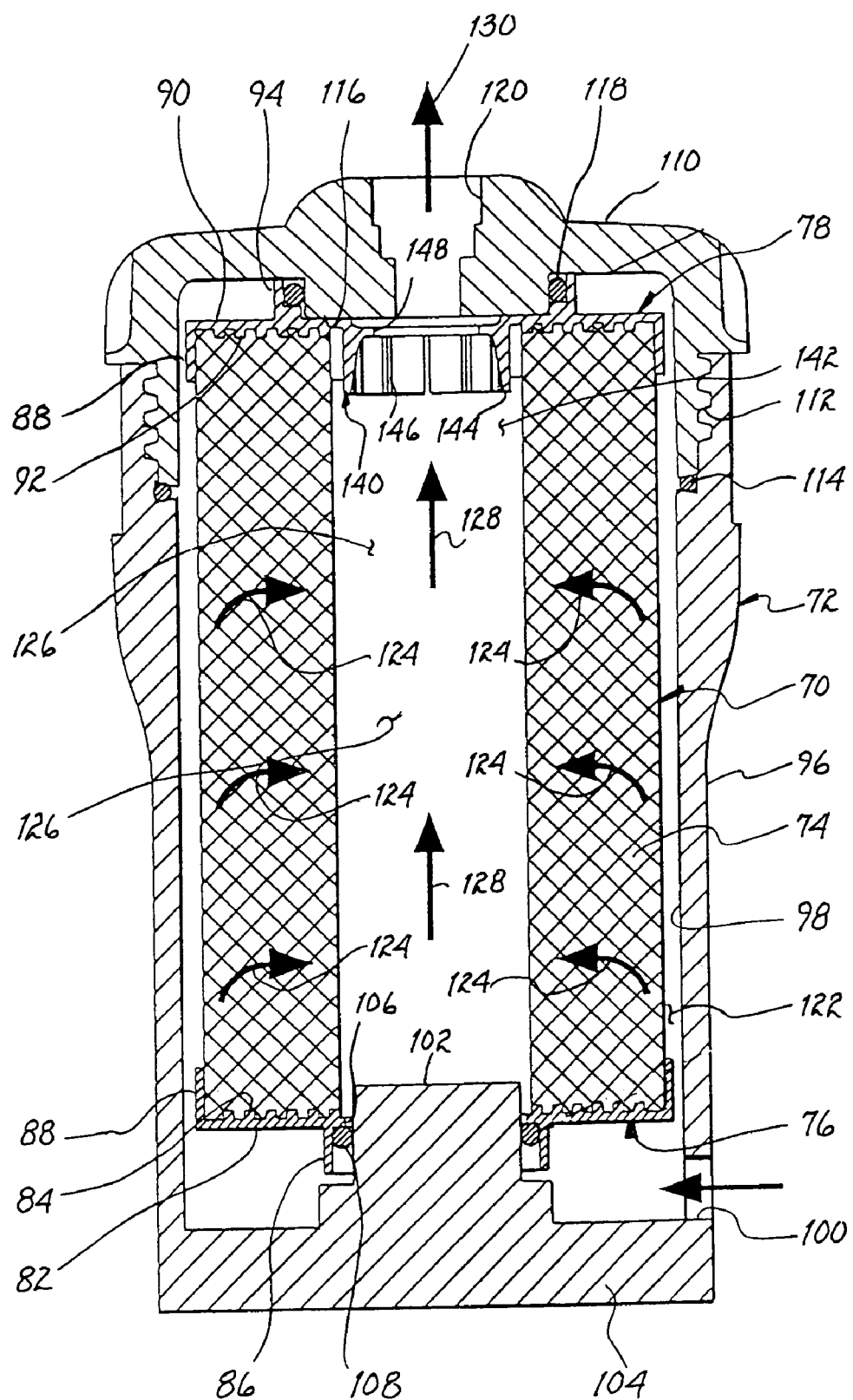
FIG. 3 illustrates a cross section view of a filter cartridge and housing incorporating the present invention.

Referring to FIG. 3, there is illustrated a filter cartridge 70 and housing 72 constructed in accordance with the present invention. The filter cartridge includes a filter element 74 of a hollow cylindrical shape and having a pair of annular end caps 76, 78, reference is also made to FIGS. 6, 7, 8 and 9 illustrating the end caps. End cap 76 includes a rim 80 for encircling the filter element, which rim extends from an annular flange 82. The flange may include ribs 84 or other projections for engaging the material of filter element 74 to retain the end cap in place. A circular sleeve 86 extends from annular flange 82 to define a cylindrical space therewithin. End cap 78 includes the same elements as end cap 76. However, the main difference between the two end caps is that circular sleeve 94 of end cap 78 is of greater diameter than that of circular sleeve 86 of end cap 76. Thereby, the amount of surface area of annular flange 82 radially external to circular sleeve 86 is less for end cap 78 than it is for end cap 76.

Figure 6:
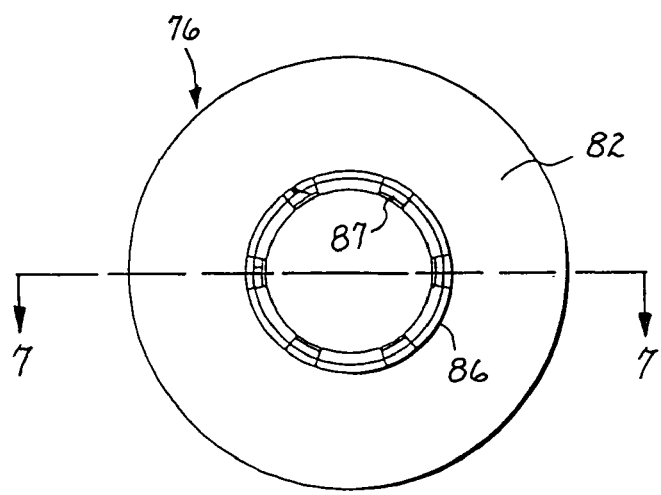
FIG. 6 is a plan view of a bottom end cap.
Figure 7:
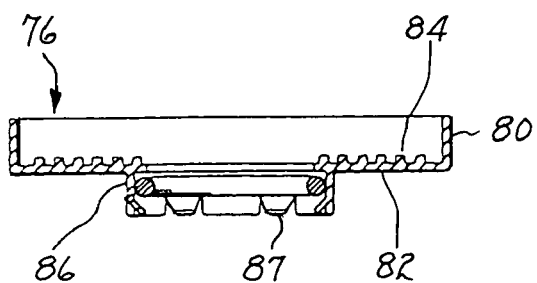
FIG. 7 is a cross sectional view taken along lines 7—7, as shown in FIG. 6.

Housing 72 includes a cylinder 96 defining a compartment 98 for receiving filter cartridge 70. It also includes an inlet 100 for introducing fluid to be filtered. A circular in cross section support or stud 102 extends upwardly from bottom 104 of cylinder 96 to penetrably engage aperture 106 in annular flange 82. As shown in FIG. 3, the diameter of circular sleeve 86 of end cap 76 is greater than the diameter of stud 102. An O-ring 108 is disposed about stud 102. Circular sleeve 86 encircles and sealingly engages O-ring 108 to effect a seal between end cap 76 and stud 102. As shown in FIGS. 6 and 7, circular sleeve 86 may be segmented with segment 87 extending radially inwardly to retain O-ring 108 within the circular sleeve. By inspection, it will become evident that filter cartridge 70 may translate along its axis of rotation to some extent and O-ring 108 will accommodate such translation without compromising the seal between the circular sleeve and the stud. The extent of translation possible is, of course, a function of the width of circular sleeve 86, the height of stud 102 and the relative position of end cap 76 with the stud.

Top 110 is threadedly engaged with cylinder 96 by threads 112 to secure the top to the cylinder and retain filter cartridge 70 therebetween. The junction between the top and the cylinder is sealed by O-ring 114 to prevent leakage through the junction. Top 110 includes a circular stud 116 extending downwardly into the space defined by circular sleeve 94 of end cap 78. The diameter of stud 116 is less than the internal diameter of circular sleeve 94 to permit placement of an O-ring 118 therebetween and effect a seal. An outlet 120 is disposed in top 110 to accommodate outflow of filtered fluid, as represented by arrow 130.

A fluid to be filtered is introduce through inlet 100 and flows into annular space 122 disposed between cylinder 96 and the external surface of filter element 74. The fluid to be filtered then flows through the filter element, as depicted by arrows 124. The filtered fluid entering axial space 126 flows toward outlet 120, as depicted by arrows 128 and through the outlet, as depicted by arrow 130.

To accommodate uses wherein an ultra-violet lamp is disposed within filter cartridge 70 to irradiate and kill microorganisms in the fluid flowing out of filter element 74 and to oxidize any organic matter that may be present a positioning member 140 may be incorporated in end cap 78. The positioning member extends downwardly within cylindrical space 142 interior of filter element 74. It includes a circular shroud 144 that may support a plurality of radially inwardly extending ribs 146. These ribs, or the interior surface of the shroud, may be canted inwardly toward the upper end, as illustrated. An aperture 148 is centrally disposed within end cap 78 internal of the shroud to accommodate flow of the fluid through the shroud and into outlet 120.

Figure 4:
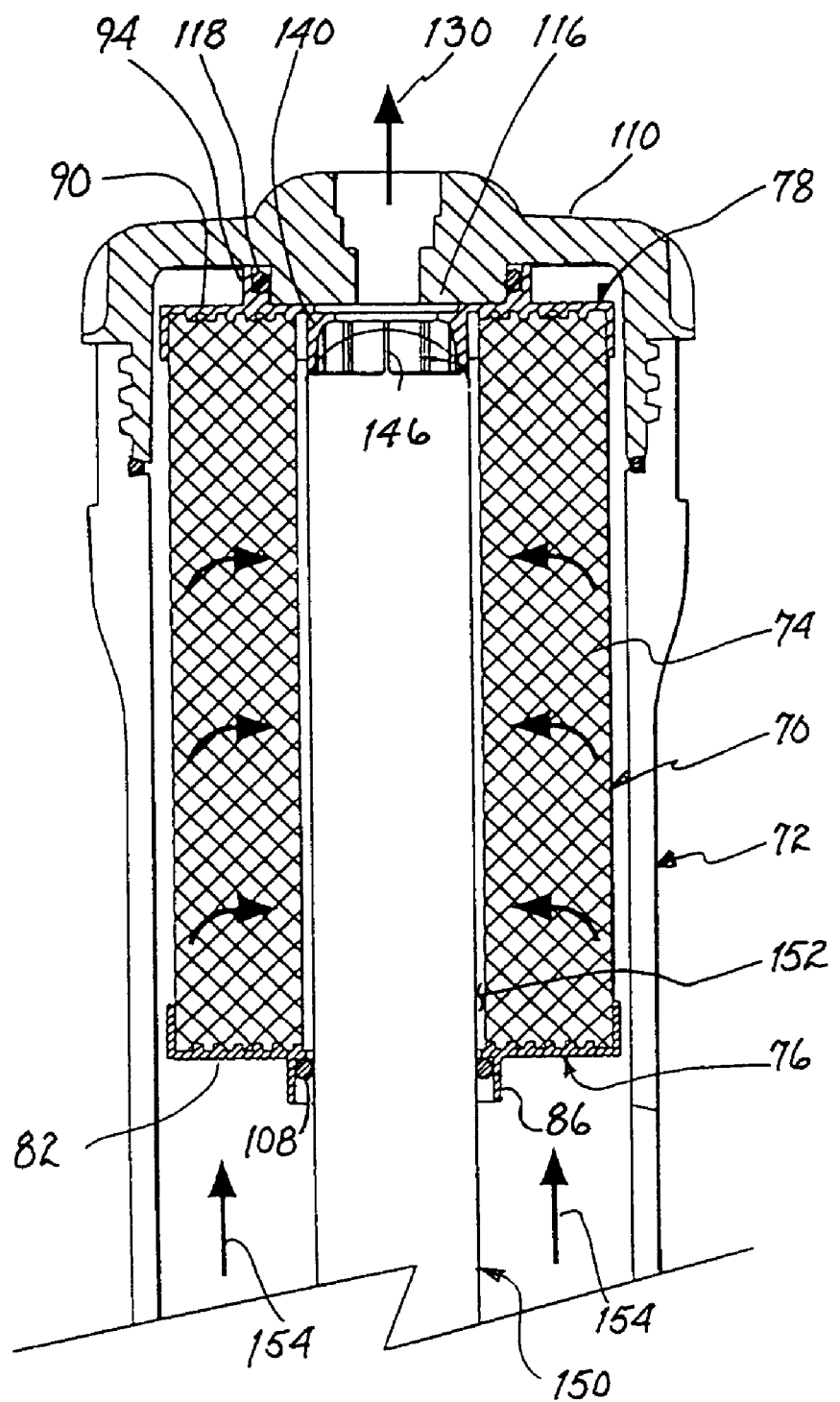
FIG. 4 illustrates translation and bias of a filter cartridge in response to pressure differentials induced by a fluid to be filtered.

FIG. 4 illustrates a filter cartridge 70 and housing 72 as shown in FIG. 3 with the addition of a sleeve 150 extending upwardly from bottom 104 of the housing. The sleeve is of ultra-violet transmissive materials, such as quartz. An ultra-violet lamp is mounted interior of the sleeve to irradiate the water flowing out of filter element 74 into annular space 152 intermediate the filter element and sleeve 150. The upper end of the sleeve is rounded, as illustrated, and nests within shroud 140 against ribs 146, which ribs help stabilize the sleeve within the housing. Circular sleeve 86 of end cap 76 extends about sleeve 150 in spaced relationship therewith to accommodate O-ring 108 placed therebetween to form an effective seal to prevent unfiltered fluid from entering annular space 152. Thus, sleeve 150 acts in the manner of a support for the filter cartridge. As discussed above, the area of annular flange 82 is greater than the area of annular flange 90 of end cap 78. Even though the pressure of the unfiltered fluid acting upon each of annular flanges 82, 90 is essentially the same, the force acting upon end cap 76 is greater than the force acting upon end cap 78 due to the differences in area. Such greater force acting upon end cap 78 will urge filter cartridge 70 along sleeve 152 toward top 110, as depicted by arrows 154. This force positionally biases the filter cartridge toward top 110 and will result in maintaining the integrity of the seal provided by O-ring 118 intermediate circular sleeve 94 and stud 116. That is, the seal attendant top 110 is maintained both statically and dynamically.

Figure 5:
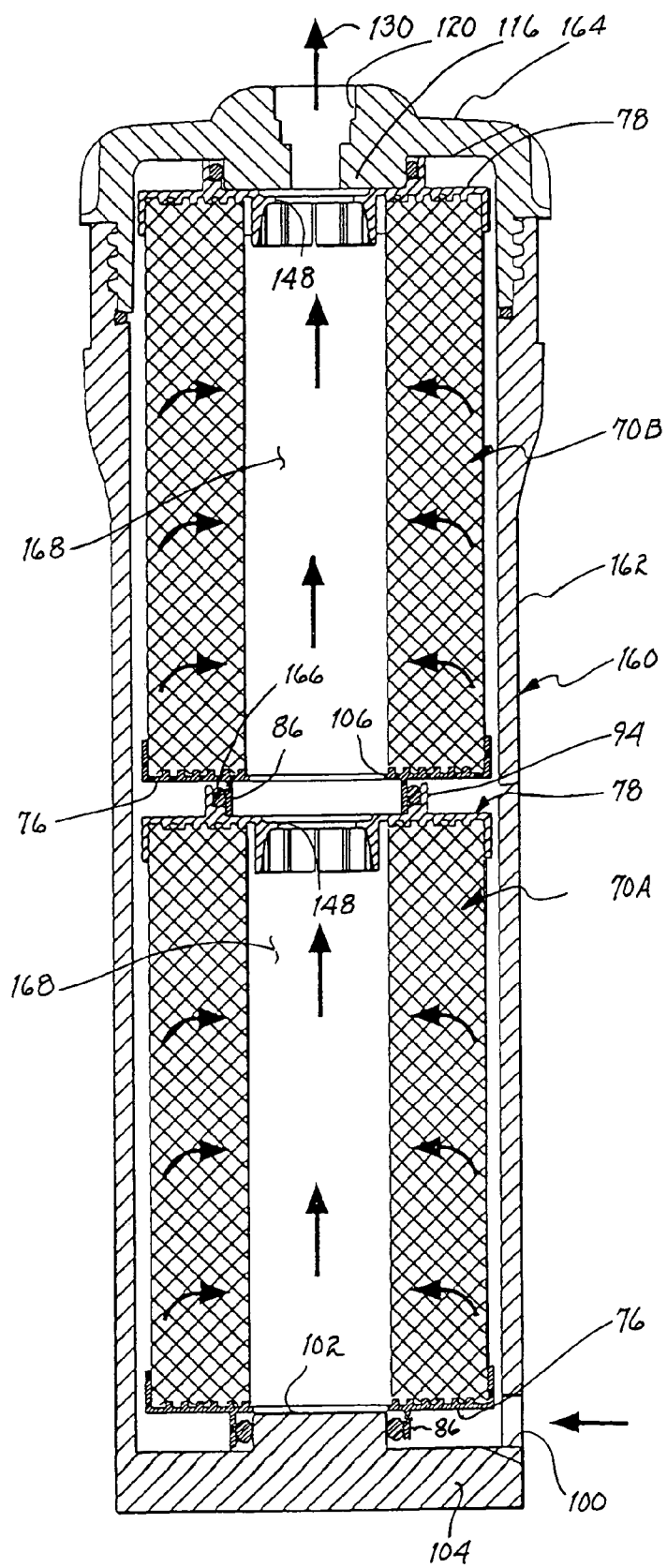
FIG. 5 illustrates axially stacked filter cartridges within a housing.
Figure 9:
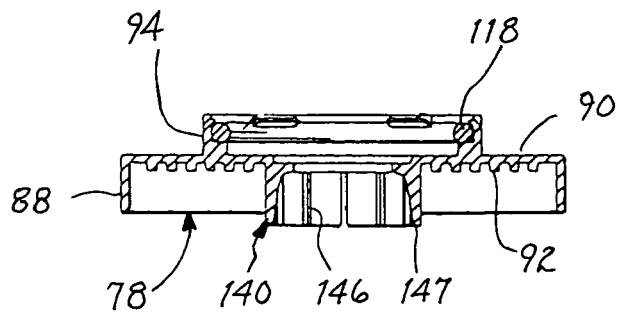
FIG. 9 is a cross sectional view taken along lines 9—9 as shown in FIG. 8.
Figure 8:
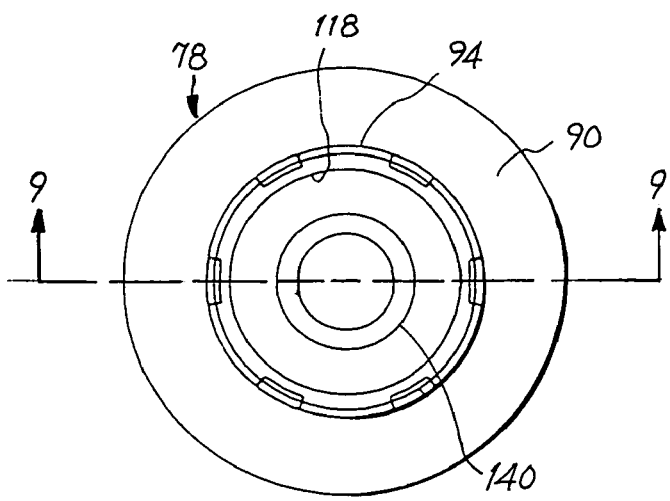
FIG. 8 is a plan view of a top end cap.

Referring to FIG. 5, there is showing a further embodiment of the present invention wherein multiple filter cartridges are stacked end to end. Housing 160 is formed of cylinder 162 and top 164 secured to the cylinder in the manner described above. Cylinder 162 is of sufficient length to accommodate two or more filter cartridges. In the embodiment illustrated, two filtered cartridges (70A, 70B) are mounted end to end within housing 160. End cap 76 of lower filter cartridge 70A is mounted on stud 102 of bottom 104, as described above. Similarly, end cap 78 of the upper filter cartridge 70B is mounted upon stud 116 of top 164, as described above. End cap 78 at the upper end of lower filter cartridge 70A includes a circular sleeve 94 which is of greater diameter than circular sleeve 86 extending from end cap 76 located at the bottom of the upper filter cartridge 70B. The annular space between circular sleeves 86 and 94 is filled with an O-ring 166 to effect a seal therebetween. Thereby, the unfiltered fluid entering through inlet 100 is precluded from flowing into cylindrical space 168 within each of filter cartridges 70A, 70B. Flow through circular space 168 into outlet 120 is accommodated by aperture 148 in end cap 76 of lower filter cartridge 70A, aperture 106 in end cap 76 of upper filter cartridge 70B and aperture 148 in end cap 78 of the upper filter cartridge. As discussed above, any contraction or expansion of the filter elements of either or both of filter cartridges 70A, 70B after a period of use may result in axial displacement of the circular sleeves relative to one another or an circled stud. Since an intervening O-ring may roll or slide to accommodate such displacement, the sealing effect of the O-rings is not compromised.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

The invention claimed is:

1. A filter cartridge adapted to be supported within a housing by at least one of a rounded upper end of a cylindrical UV lamp and a stud of the housing, said filter cartridge being adapted to filter fluid flowing therethrough and into said filter cartridge and past the UV lamp and to accommodate irradiation of the filtered water with UV, said filter cartridge comprising in combination:
   a) a cylindrical filter element having first and second opposed ends;
   b) a first end cap and a second end cap;
   c) said first end cap including a first annular flange juxtaposed with said first opposed end of said filter element, a first circular sleeve extending from said first annular flange axially away from said filter element, a positioning member defining an aperture in and being supported by said first annular flange, said positioning member including a circular shroud extending into said filter element for engaging and being adapted to receive support from the rounded upper end of the UV lamp and a first rim circumscribing said first opposed end of said filter element; and
   d) said second end cap including a second annular flange juxtaposed with said second opposed end of said filter element, a second circular sleeve extending from said second annular flange axially away from said filter element, said second circular sleeve having a diameter greater than the diameter of the UV lamp and adapted to engage and receive support from the stud, said second circular sleeve having a lesser outer diameter than the inner diameter of said first circular sleeve, a seal disposed intermediate said second circular sleeve and the stud, and a second rim circumscribing said second opposed end of said filter element.

2. A filter cartridge as set forth in claim 1 wherein said first annular flange includes a plurality of ribs for engaging said first opposed end of said filter element.

3. A filter cartridge as set forth in claim 1 wherein said second annular flange includes a plurality of ribs for engaging said second opposed end of said filter element.

4. A filter cartridge as set forth in claim 3 wherein said first annular flange includes a plurality of ribs for engaging said first opposed end of said filter element.

5. A filter cartridge adapted to be supported upon a rounded upper end of a cylindrical UV lamp and proximate a lower end of the UV lamp, said filter cartridge being adapted to filter fluid flowing to and past the UV lamp to accommodate irradiation of the filtered water with UV, said filter cartridge comprising in combination:
 a) a cylindrical filter element having first and second opposed ends;
 b) a first end cap and a second end cap;
 c) said first end cap including a first annular flange juxtaposed with said first opposed end of said filter element, a first circular sleeve extending from said first annular flange axially away from said filter element, a positioning member supported by said first annular flange and including a circular shroud extending into said filter element having ribs for engaging and being adapted to receive support from the rounded upper end of the UV lamp, an aperture located radially inwardly of said circular shroud, and a first rim circumscribing said first opposed end of said filter element; and
 d) said second end cap including a second annular flange juxtaposed with said second opposed end of said filter element, a second circular sleeve extending from said second annular flange axially away from said filter element, said second circular sleeve having a diameter greater than the diameter of the UV lamp and adapted to engage and receive support from a location proximate the lower end of the UV lamp, a seal disposed adjacent said second circular sleeve and adapted to seal the junction between said second circular sleeve and the location proximate the lower end of the UV lamp, and a second rim circumscribing said second opposed end of said filter element.

6. A filter cartridge as set forth in claim 5 wherein said second circular sleeve is a lesser diameter than said first circular sleeve.

7. A filter cartridge as set forth in claim 5 wherein said first annular flange includes a plurality of ribs for engaging said first opposed end of said filter element.

8. A filter cartridge as set forth in claim 5 wherein said second annular flange includes a plurality of ribs for engaging said second opposed end of said filter element.

9. A filter cartridge as set forth in claim 8 wherein said first annular flange includes a plurality of ribs for engaging said first opposed end of said filter element.

10. A filter cartridge adapted to be stacked in axial alignment with another of said filter cartridges, each of said filter cartridges comprising in combination:
 a) a cylindrical filter element having first and second opposed ends;
 b) a first end cap and a second end cap;
 c) said first end cap including a first annular flange juxtaposed with said first opposed end of said filter element, a first circular sleeve extending from said first annular flange axially away from said filter element, and a first rim circumscribing said first opposed end of said filter element;
 d) said second end cap including a second annular flange juxtaposed with said second opposed end of said filter element, a second circular sleeve extending from said second annular flange axially from said filter element, said second sleeve having an outer diameter less than the inner diameter of said first sleeve, and a second rim circumscribing said second opposed end of said filter element; and
 e) wherein at least two of said filter cartridges are placed in axial engagement with one another to locate said second circular sleeve of one of said filter cartridges within said first circular sleeve of the other of said filter cartridges and including a seal disposed intermediate said first and second circular sleeves of said one and said other of said filter cartridges, respectively, to seal the junction therebetween.

* * * * *